US006333464B1

(12) United States Patent
Ellison

(10) Patent No.: US 6,333,464 B1
(45) Date of Patent: Dec. 25, 2001

(54) ELECTRIC WIRE SPLICE CONNECTOR

(76) Inventor: Abram Arnold Ellison, 19925 Lauder, Detroit, MI (US) 48235

( * ) Notice: Subject to any disclaimer, the term of this patent is extended or adjusted under 35 U.S.C. 154(b) by 0 days.

(21) Appl. No.: 09/586,509

(22) Filed: Jun. 2, 2000

Related U.S. Application Data

(63) Continuation-in-part of application No. 09/275,117, filed on Mar. 24, 1999.
(60) Provisional application No. 60/109,485, filed on Nov. 23, 1998.

(51) Int. Cl.[7] .......... H02G 15/10
(52) U.S. Cl. .......... 174/92; 174/138 F
(58) Field of Search .......... 174/84 R, 84 C, 174/88 R, 92, 138 F

(56) References Cited

U.S. PATENT DOCUMENTS 3,049,582 * 8/1962 Shinn .......... 174/92
3,519,731 * 7/1970 Grunbaum .......... 174/92
5,525,756 * 6/1996 Mullaney et al. .......... 174/92

* cited by examiner

*Primary Examiner*—Chau N. Nguyen
(74) *Attorney, Agent, or Firm*—Garrier, Blackman & Associates; William D. Blackman; Joseph P. Carrier

(57) ABSTRACT

A splicing assembly, for facilitating splice connections of electric wires, includes a housing made of nonconductive material, and a terminal assembly attached to an inner surface of the housing. The housing includes a base, and a cover placeable in covering relation over the base. The housing cover is removably attachable to the base. The housing base and cover define a protected space therebetween, and also define an inlet and an outlet therebetween for respectively receiving wires in opposite ends thereof for connection of the wires within the protected space. The housing base may include one or more mounting blocks, for supporting metallic conductors thereon. The mounting blocks, where used, are generally non-conductors. The terminal assembly includes at least two metallic conductors attached to the base, which may be provided as generally flattened metal bars. The terminal assembly also includes adjustably tightenable clamps for clamping wires against the metallic conductors. The clamps are operatively connected to the housing base, and in a preferred embodiment of the invention, the clamps are adjustably attached to the conductors. Optionally, the splicing device according to the invention may include a first sealing member adjacent the housing inlet, and a second sealing member adjacent the housing outlet, to resist water entry into the housing.

12 Claims, 3 Drawing Sheets

ELECTRIC WIRE SPLICE CONNECTOR

CROSS-REFERENCE TO RELATED APPLICATIONS

The present application is a C-I-P of U.S. patent application Ser. No. 09/275,117, filed Mar. 24, 1999 and from U.S. provisional patent application Ser. No. 60/109,485, filed Nov. 23, 1998. The complete disclosure of each of said patent applications is incorporated herein by reference.

BACKGROUND OF THE INVENTION

1. Field of the invention

The present invention relates to electrical wiring, and to equipment for use in splicing and connecting electric wires. More particularly, the present invention relates to an electric wire splice connector for facilitating electrical current transmission through splicing electric wires.

2. Description of the Background Art

Some enclosures and splice cases have been patented, and are known for use in connecting telecommunications and electrical wiring.

One such enclosure is disclosed in U.S. Pat. No. 3,936,590, which shows and describes a splice case or enclosure having a sealing ring at each end thereof. This reference discloses a two-part housing for enclosing a tape-wrapped manual wire splice, and a ring for placement within the housing and for sealing electrical wires into the housing.

U.S. Pat. No. 5,145,388, issued Sep. 8, 1992 to Brownlie, discloses an enclosure for interconnecting conductor wires of multiconductor cables. This invention utilizes a box-shaped enclosure having a base and a lid that is pivotally hinged to the base. Tubular terminals are disposed within the enclosure, and these terminals are mounted so as to be rotatable to cut through insulation which may be surrounding cables to be connected, and make contact with the cable wire.

Other types of enclosures and splice boxes are disclosed in U.S. Pat. Nos. 1,606,789, 2,771,502, 2,867,680, 2,881,241, 3,175,032, 3,260,794, 3,339,011, 3,798,349, and 5,245,133.

While the known splice cases and related devices are useful for their intended purposes, a need still exists in the art for a simple and easy to use device that will allow lay persons, electrical installers and repairmen to safely, easily, and reliably splice together wiring for carrying electrical current.

SUMMARY OF THE INVENTION

The present invention relates to an electric wire splice connector for promoting the transmission of electric current through facilitating splice connections of electric wires. The present invention further provides a safer alternative to the commonly used "twist and cap" tape method of splicing wires.

An electric wire splice connector according to the present invention, generally, includes a housing made of nonconductive material, and a terminal assembly, including a least one, and preferably a plurality of conductive terminals, which are connected to the housing on a mounting block.

The housing is provided to surround and protect the spliced wires and includes a base, and a cover placeable in covering relation over the base. The housing cover is removably attachable to the base.

The housing base and cover define a protected space therebetween, and also define an inlet and an outlet therebetween for respectively receiving wires in opposite ends of the assembled housing, for connection of the wires within the protected space. The outlet is preferably located at an end of the housing opposite the inlet.

In the first preferred embodiment of the electric wire splice connector, a first vertical tubular boss is provided in the housing adjacent the housing inlet for separating and spacing apart incoming wires, and for use in attaching the housing cover to the base. A second vertical tubular boss may also be provided adjacent the housing outlet for separating and spacing apart outgoing wires, and for use in attaching the housing cover to the base.

Preferably, the housing base includes one or more integrally formed mounting blocks, for supporting metallic conductors thereon. The mounting blocks, where used, are formed of non-conductive material.

The housing base may also include one or more removable punch-outs formed therein, to facilitate attachment of the electric wire splice connector to a wall or other substrate.

The terminal assembly includes at least one metallic conductor attached to the base. Each of the metallic conductors is preferred to be attached to a corresponding mounting block on the base. The metallic conductors may be provided as generally flattened metal bars. Each of the metallic conductors is preferred to be spaced apart from the other conductors to discourage electrical current flow therebetween. Non-conductive spacers may, optionally, be placed between the metallic conductors if desired.

In a single wire connector in accordance with the invention, a single wire assembly for connecting first and second wire sections together may be used. If desired, separate single wire connectors may be used to connect together individual wire sections of a multiple wire cable such as that shown in 11, 12 in FIG. 1.

In a two-wire connector in accordance with the invention, the conductors of the terminal assembly include a primary conductor for connecting first and second main wire sections together, and a secondary conductor for connecting third and fourth main wire sections together.

Optionally, in a three-wire connector in accordance with the invention, the terminal assembly conductors may also include a ground conductor for connecting first and second ground wires together.

The terminal assembly also includes adjustably tightenable clamps for clamping wires against the metallic conductors. The clamps are operatively connected to the housing base, and in a preferred embodiment of the invention, the clamps are also made of electrically conductive metal.

In one embodiment of the terminal clamps, four inverted substantially U-shaped brackets are provided for connecting wires to the ends of the metallic conductors. Also in this embodiment, a threaded fastener such as a screw or bolt is provided for attaching each of the respective first, second, third and fourth inverted substantially U-shaped members to its respective conductor.

Optionally, the electric wire splice connector according to the invention may include a first sealing member adjacent the housing inlet, and a second sealing member adjacent the housing outlet, to resist water entry into the housing.

Accordingly, it is an object of the present invention to provide a method and apparatus to safely connect electrical wires, through the use of an electric wire splice connector including a housing and a terminal assembly attached within the housing.

It is another object of the present invention to provide a splicing device which provides a safe and durable connection between spliced wires.

It is a further object of the present invention to provide a re-usable electric wire splice connector.

It is yet another object of the present invention to provide a simple, inexpensive and easily manufactured splicing device for facilitating the job of splicing wires together.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

First Embodiment-Overview

Figure 1:
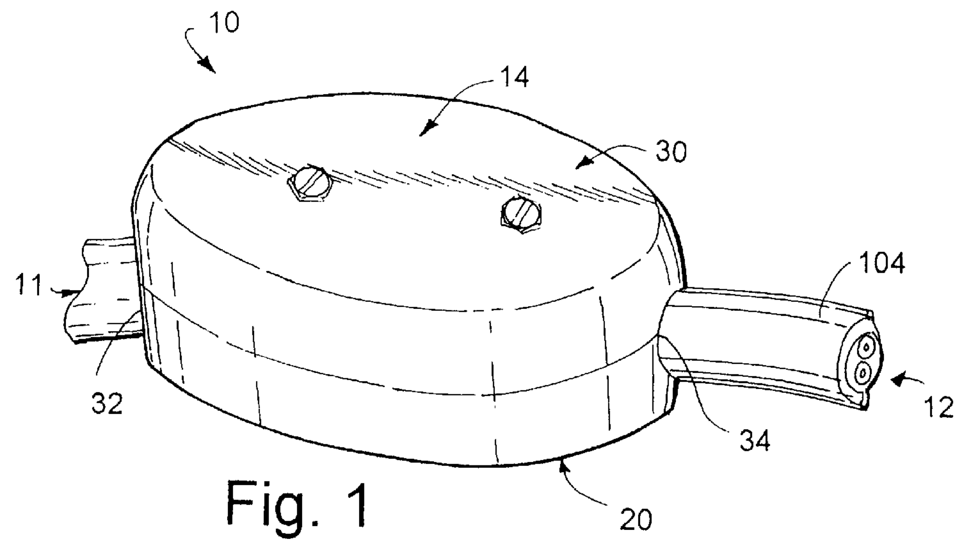
FIG. 1 is an exterior perspective view of an assembled electric wire splice connector in accordance with a first embodiment of the present invention.
Figure 2:
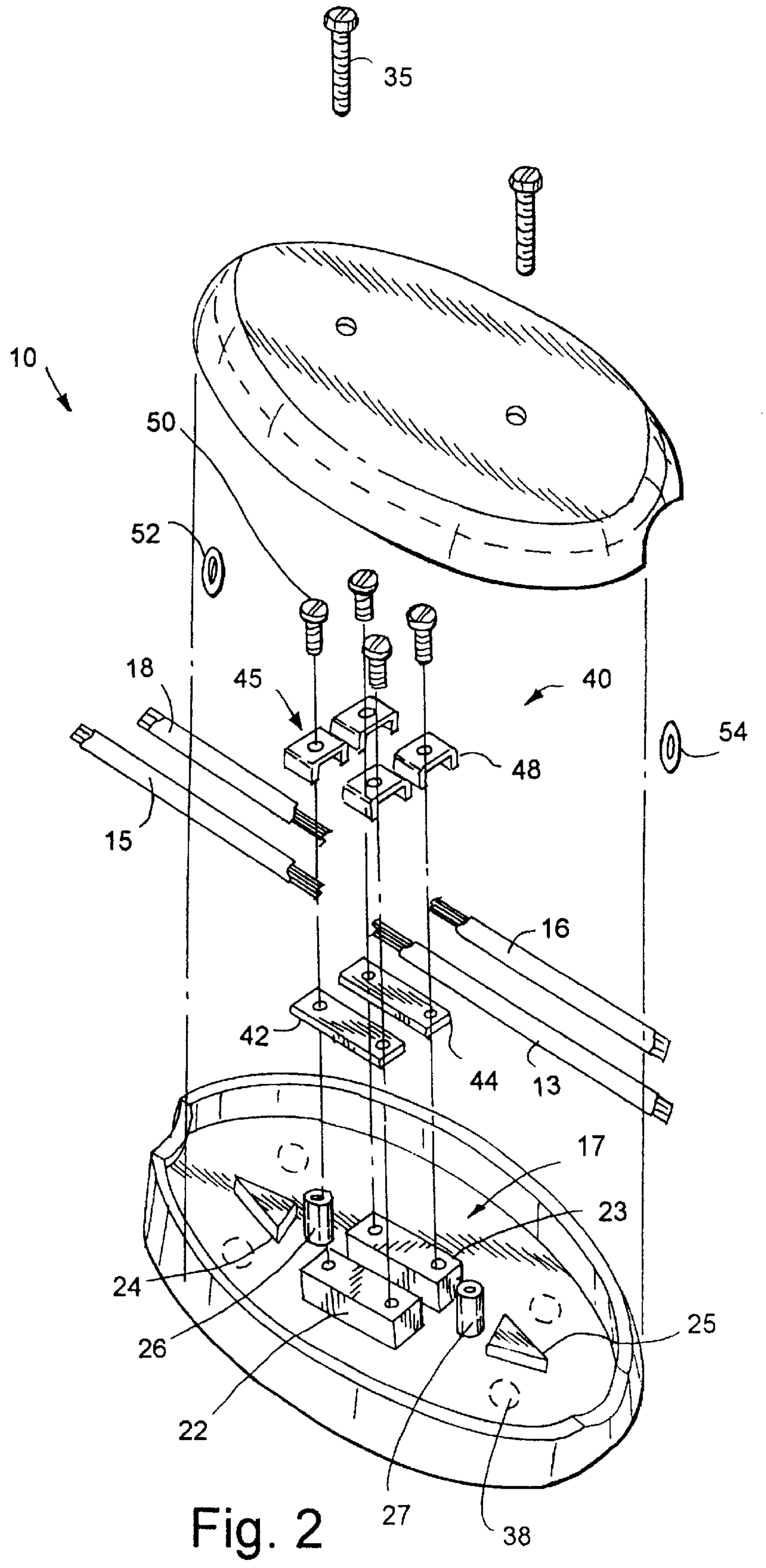
FIG. 2 is an exploded perspective view of the electric wire splice connector of FIG. 1, showing the internal components thereof.

Referring to FIGS. 1–2, a first embodiment of an electric wire splice connector is shown generally at 10. The electric wire splice connector 10 is provided for splicing together electric cables such as those shown at 11, 12 (FIG. 1) which normally include multiple wire sections, such as those shown in FIG. 2 at 13, 15, 16 and 18. In the embodiment of FIGS. 1–2, each of the respective cables 11, 12 includes two wires therein. The cables 11, 12 generally include tubular insulated sheathing 104 surrounding the wires in conventional fashion. The cables 11, 12 are not part of the invention, per se, rather the invention relates to the electric wire splice connector 10 which is usable to facilitate splicing the electrical wires of the cables together.

Optionally, a 3-wire cable can be spliced with the splice connector 10 by cutting the ground wire, and connecting together only the wires 13, 15, 16 and 18 from sections 11, 12. The splice connector 10 of FIGS. 1–2 may be used in this way.

The electric wire splice connector 10 includes a housing 14, which is made up of a base 20 for supporting a terminal assembly and associated wiring, and a cover 30 for placement in covering relation over the base. The base 20 may include one or more non-conductive mounting blocks 22, 23, which may be separate components glued on the base floor, or alternatively, may be integrally cast as part of the base. The electric wire splice connector 10 further includes a terminal assembly 40 disposed within the housing and attached thereto. Each of these components will be discussed in further detail below.

The Housing

The housing 14 is provided to surround and protect the spliced wire sections 13, 15, 16 and 18. Both the base 20 and cover 30 are made of a nonconductive material, preferably a plastic. The base 20 and cover 30 also define an inlet 32 and outlet 34 therebetween for receiving respective cable ends 11, 12 in opposite ends thereof, for connection of the wires within a protected space 17 defined between the base and cover.

The base 20 is preferred to contain at least one, and preferably two mounting blocks 22, 23 therein for respectively supporting two spaced apart metallic conductors 42, 44 thereon. The mounting blocks 22, 23 may either be separate pieces which are glued or otherwise attached to the floor of the base 20, or else may be integrally formed as part of the base when it is cast. Optionally, the mounting blocks 22, 23 may be color-coded to match insulation surrounding the individual wire sections 13, 15, 16 and 18.

Optionally, but not necessarily, the base 20 may also contain separator wedges 24, 25, respectively located inside the inlet and outlet. Where used, the separator wedges 24, 25 are provided for separating, supporting and spacing apart pairs of incoming and outgoing wires.

The base 20 also contains internally threaded vertical tubular bosses 26, 27 to receive screws or other threaded fasteners 35 therein, to removably connect the cover 30 and the base together.

As an alternative to using separate tubular bosses 26, 27 and separator wedges 24, 25, the functions of the features may be combined. In other words, instead of the arrangement shown in FIG. 2, threaded bores may be formed in the separator wedges 24, 25, and appropriately spaced holes would then be formed, through the cover, above the bores of the separator wedges. In this instance, the tubular bosses 26, 27 would then be eliminated from the housing.

Optionally, the base may have one or more removable punch-outs 38 formed in a wall thereof, for use in mounting the electric wire splice connector 10 to a wall or other substrate. The punch-outs 38 are areas of the housing wall which have been pre-weakened for easy removal thereof, where desired. The punch-outs may be punched out with an appropriate tool, if so desired, to create holes in the base 20 to accommodate appropriate mounting hardware.

The Terminal Assembly

The terminal assembly 40 includes at least two metallic conductors 42, 44 attached to the respective mounting blocks 22, 23. The conductors 42, 44 may be provided as generally flattened metal bars, as shown.

The terminal assembly 40 includes a plurality of clamping members 45. The clamping members 45 are operatively connected to the housing base 20.

In the embodiment of FIGS. 1–2, the clamping members are provided as inverted substantially U-shaped members 48 for placement over the exposed ends of the wires and the ends of the metallic conductors 42, 44, and for clamping the wire ends against the metallic conductors. In the embodiment of FIG. 2, the terminal assembly 40 includes four inverted substantially U-shaped members 48.

Figure 3:
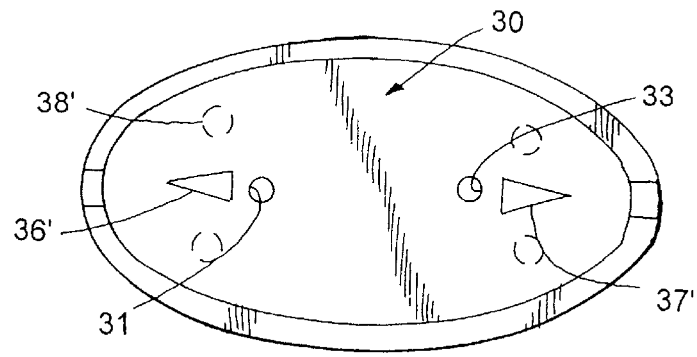
FIG. 3 is a bottom plan view of the inside of the housing cover of the first embodiment.

The terminal assembly 40 also includes threaded fasteners 50, such as screws or the like, for attaching each of the respective U-shaped members 48 to the appropriate mounting block 22 or 23. In the embodiment of FIGS. 1–3, the metallic conductors 42, 44 each have holes formed in the respective first and second ends thereof to receive the threaded fasteners 50 therethrough, so that the conductors may be attached to the base 20.

In using the electric wire splice connector, the fasteners 50 are loosened up, and then exposed ends of the wires 13, 15,

16, 18 are placed between the U-shaped members 48 and the tops of the metallic conductors 42, 44. Once the ends of the wires 13, 15, 16, 18 are in place, the fasteners 50 may be tightened down to releasably attach the wires to the respective metallic conductors 42, 44.

If desired, in a stripped-down version (not shown) of the electric wire splice connector according to the invention, the U-shaped members 48 could be dispensed with, and the exposed ends of the wires 13, 15, 16, 18 could then simply be wrapped around the shafts of the fasteners 50, which could then be tightened down to clamp the wire ends against the conductors 42, 44.

The housing 14 may be provided with O-rings or similar annular sealing members 52, 54 for respective placement in saddle grooves formed in the base and cover, where the cables 11, 12 pass through the the housing inlet 32 and outlet 34 to resist any flow of water into the housing.

The inlet and outlet holes may be modified, if desired, to receive two or more cable wires in a single end of the housing for a particular application. Alternatively, the inlet and outlet holes could be modified to receive conduit sections therein.

Referring to FIG. 3, the underside of the cover 30 is shown. In the depicted embodiment, the cover 30 has a pair of spaced apart holes 31, 33 formed therethrough to allow the fasteners 35 to pass therethrough. The cover 30 may, optionally, contain complimentary separator wedges 36', 37' for alignment with the separator wedges 36, 37 of the base 20. The cover 30 may also optionally include one or more additional punch-outs 38' if desired.

Second Embodiment-Overview

Figure 4:
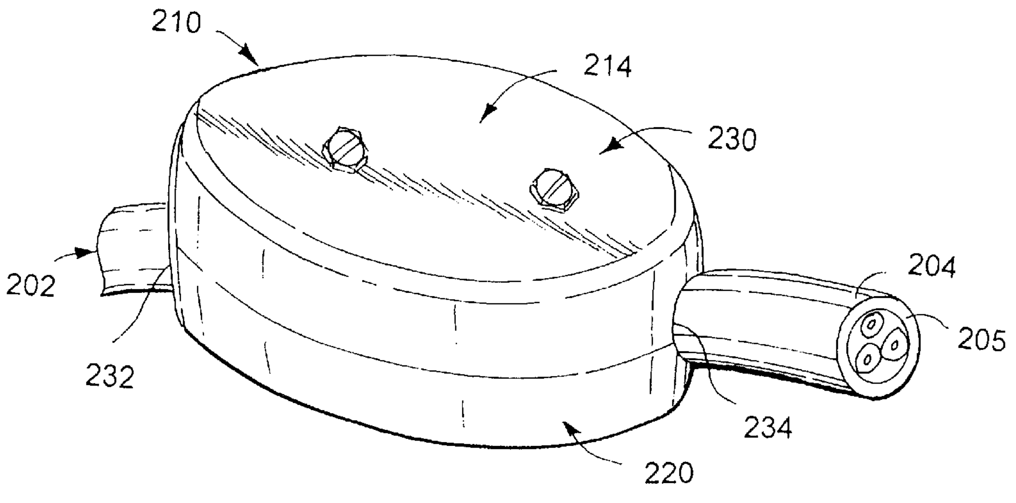
FIG. 4 is an exterior perspective view of an assembled electric wire splice connector in accordance with a second embodiment of the present invention.
Figure 5:
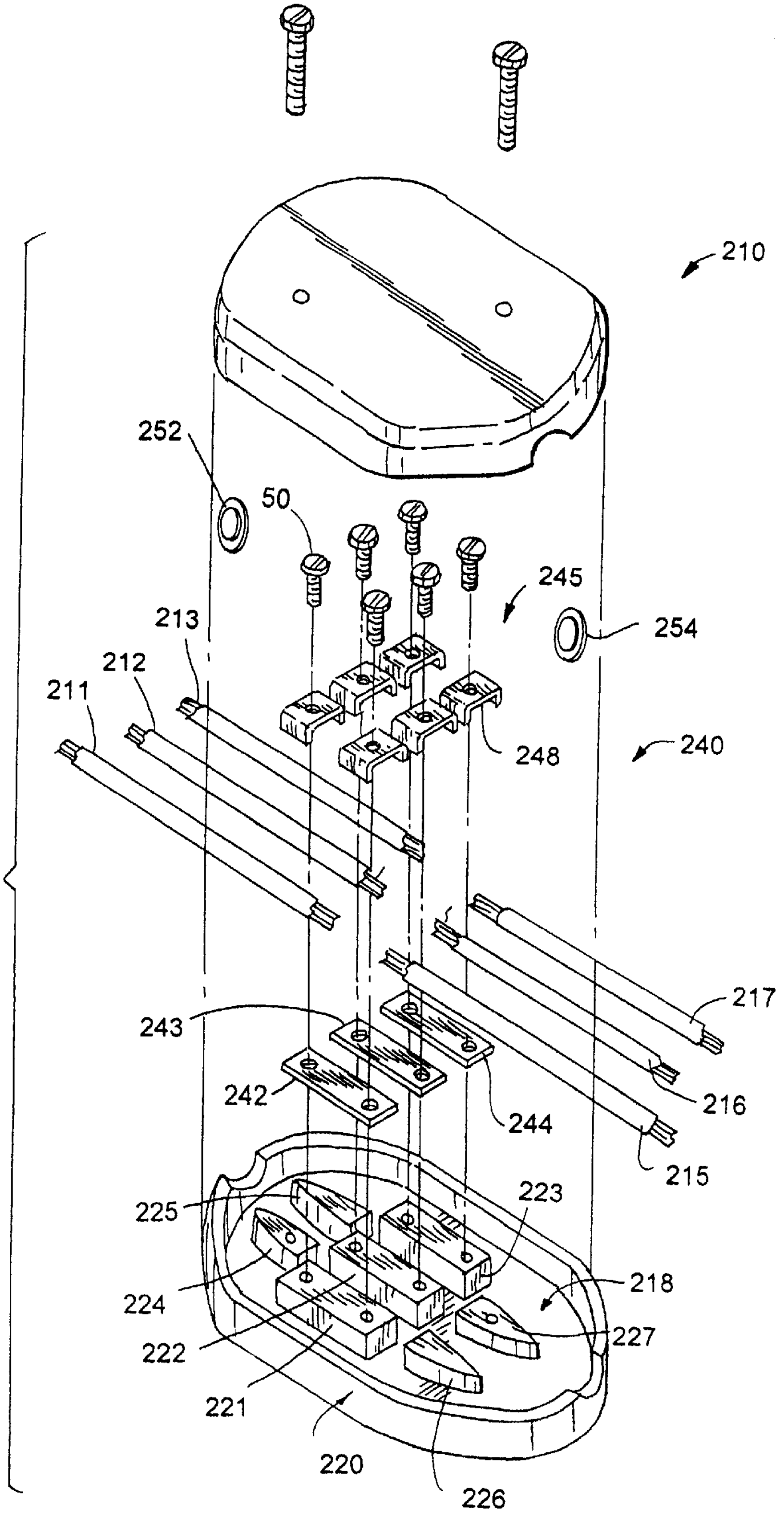
FIG. 5 is an exploded perspective view of the electric wire splice connector of FIG. 4, showing the internal components thereof.

Referring to FIGS. 4–5, a second embodiment of an electric wire splice connector is shown generally at 210. The electric wire splice connector 210 is provided for splicing together electric cables such as those shown at 202, 204 (FIG. 4), which normally include multiple wire sections, such as those shown in FIG. 4 at 211, 212, 213, 215, 216, and 217.

In the embodiment of FIG. 4, each of the respective cables 202, 204 includes three wires therein. The cables 202, 204 generally include tubular insulated sheathing 205 surrounding the wires in conventional fashion. The cables 202, 204 are not part of the invention, per se, rather the invention relates to the electric wire splice connector 210, which is usable to facilitate splicing the electrical wires of the cables together.

The electric wire splice connector 210 includes a housing 214, which is made up of a base 220 for supporting a terminal assembly and associated wiring, and a cover 230 for placement in covering relation over the base. The electric wire splice connector 210 further includes a terminal assembly 240 disposed within the housing 214 and attached thereto. Each of these components will be discussed in firther detail below.

The Housing

The housing 214 is provided to surround and protect the spliced wires 211, 212, 213, 215, 216, and 217. Both the base 220 and cover 230 are made of a nonconductive material, preferably a plastic. The base 220 and cover 230 also define an inlet 232 and outlet 234 therebetween for receiving respective cable ends 202, 204 in opposite ends thereof, for connection of the wires within a protected space 218 defined between the base and cover.

In the embodiment of FIGS. 4–5, the base 220 contains three integrally formed mounting blocks 221, 222, 223 therein for respectively supporting three spaced apart metallic conductors 242, 243, 244 thereon. The mounting blocks 221, 222, 223 may either be separate pieces which are glued or otherwise attached to the floor of the base 220, or else may be integrally formed as part of the base when it is cast. Optionally, the mounting blocks 221, 222, 223 may be color-coded to match insulation surrounding the individual wire sections 211, 212, 213, 215, 216, and 217. For example, a first mounting block 221 may be colored white to match insulation on one of the main wire sections, a second mounting block 222 may be colored black to match insulation on another of the main wire sections, and a third mounting block 223 may be colored green to match standard insulation surrounding ground wire sections.

Also in the embodiment of FIGS. 4–5, the base further contains four separator wedges 224, 225, 226, and 227, respectively located inside the inlet and outlet. The separator wedges 224, 225, 226, and 227 may optionally, but not necessarily be provided for separating, supporting and spacing apart the incoming and outgoing wires.

If desired, selected separator wedges 224, 227 may have threaded holes formed vertically therein to receive threaded fasteners, to aid in fastening the cover 230 to the base 220.

Optionally, the base or cover may have one or more removable punch-outs formed in a wall thereof, for use in mounting the electric wire splice connector 210 to a wall or other substrate, as discussed in connection with the first embodiment of FIGS. 1–3. The punch-outs may be punched out with an appropriate tool, if so desired, to create holes in the base 220 to accommodate appropriate mounting hardware.

The Terminal Assembly

As previously noted, the terminal assembly 240 includes three metallic conductors 242, 243, 244 attached to the respective mounting blocks 221, 222, 223. The conductors 242, 243, 244 may be provided as generally flattened metal bars, as shown.

The terminal assembly 240 includes a plurality of clamping members 245. The clamping members 245 are operatively connected to the housing base 220.

In the embodiment of FIGS. 4–5, the clamping members 245 are provided as inverted substantially U-shaped members 248 for placement over the respective exposed ends of the wires 211, 212, 213, 215, 216, and 217, and also covering the ends of the metallic conductors 242, 243, 244, and for clamping the wire ends against the metallic conductors. In the embodiment of FIG. 4, the terminal assembly 240 includes six inverted substantially U-shaped members 248.

The terminal assembly 240 also includes threaded fasteners 50, such as screws or the like, for attaching each of the respective U-shaped members 248 to the appropriate mounting block 221, 222, or 223. In the embodiment of FIGS. 4–5, the metallic conductors 242, 244 each have holes formed in the respective first and second ends thereof to receive the threaded fasteners 50 therethrough, so that the conductors may be attached to the base 220.

In using the electric wire splice connector, the fasteners 50 are loosened up, and then exposed ends of the wires 211, 212, 213, 215, 216, and 217 are placed between the U-shaped conductors 248 and the tops of the metallic conductors 242, 243, and 244. Once the ends of the wires are in place, the fasteners 50 may be tightened down to releasably attach the wires to the metallic conductors 242, 243, 244.

Optionally, but not necessarily, the housing 214 may be provided with O-rings or similar annular sealing members 252, 254 for respective placement in saddle grooves formed in the base and cover, where the cables 202, 204 pass through the housing inlet 232 and outlet 234 to resist any flow of water into the housing.

Although the present invention has been described herein with respect to a preferred embodiment thereof, the foregoing description is intended to be illustrative, and not restrictive. Those skilled in the art will realize that many modifications of the preferred embodiment could be made which would be operable. For example, the splice connector is not limited to being used with 110 volt AC current, but instead, may be modified, as appropriate, to splice all types of electrical wiring. All such modifications, which are within the scope of the claims, are intended to be within the scope and spirit of the present invention.

What is claimed is:

1. A splicing device for facilitating connection of electrical wires, comprising:

a housing made of nonconductive material, the housing comprising:

a base;

a cover placeable in covering relation over the base and being removably attachable thereto, the base and cover defining an inlet and an outlet therebetween for respectively receiving said electrical wires, the outlet being spaced away from the inlet; and a terminal assembly comprising:

at least one metallic conductor attached to the base; and adjustably tightenable means for clamping said electrical wires against the at least one metallic conductor, said adjustably tightenable clamping means comprising a separate releasably tightenable fastener for each of said electrical wires, and a clamping member operatively associated with each releasably tightenable fastener;

wherein the adjustably tightenable clamping means is operatively connected to the housing base.

2. The splicing device of claim 1, further comprising a first sealing member adjacent the housing inlet and a second sealing member adjacent the housing outlet.

3. The splicing device of claim 1, wherein the housing base includes a mounting block, and wherein the at least one metallic conductor is attached to the mounting block.

4. The device of claim 3, wherein at least two of said mounting blocks are provided in said housing base, secured to said housing base and disposed under said metallic conductors, with a threaded hole formed in each end of said mounting blocks.

5. The device of claim 1, wherein said housing base comprises two nonconductive internally threaded tubes integrally secured to an inner surface thereof and extending inwardly in said housing;

and wherein two threaded fasteners are provided for threadable engagement in said threaded tubes of said base, to attach said cover to said base.

6. The splicing device of claim 1, wherein said at least one metallic conductors comprises a primary conductor for connecting first and second main wire sections, a secondary conductor for connecting third and fourth main wire sections, and a ground conductor for connecting first and second ground wire sections;

wherein each of said conductors are spaced apart from the other conductors to discourage electrical current flow therebetween.

7. A splicing device for facilitating connection of electrical wires, comprising:

a housing made of nonconductive material, the housing comprising:

a base;

a cover placeable in covering relation over the base and being removably attachable thereto, the base and cover defining an inlet and an outlet therebetween for respectively receiving said electrical wires, the outlet being spaced away from the inlet; and a terminal assembly comprising:

at least two metallic conductors attached to the base; and adjustably tightenable means for selectively clamping said electrical wires against said at least two metallic conductors, wherein the clamping means is operatively connected to the housing base, and wherein the clamping means comprises:

a first inverted substantially U-shaped member for connecting a first wire section selected from said electrical wires to a first end of a primary one of said metallic conductors;

a second inverted substantially U-shaped member for connecting a second wire section selected from said electrical wires to a second end of said primary metallic conductor;

a third inverted substantially U-shaped member for connecting a third wire section selected from said electrical wires to a first end of a secondary one of said metallic conductors;

a fourth inverted substantially U-shaped member for connecting a fourth wire section selected from said electrical wires to a second end of said secondary metallic conductor; and said adjustably tightenable means comprising four threaded fasteners, wherein one of said fasteners is provided for each of the respective first, second, third and fourth inverted substantially U-shaped members;

and wherein each of the primary and secondary metallic conductors has a hole formed in each of the first and second ends thereof to receive one of the four threaded fasteners therein.

8. A splicing device for facilitating connection of electrical wires, comprising:

a housing made of nonconductive material, the housing comprising:

a base including at least one mounting block for supporting a at least one metallic conductor thereon, the base further including at least one boss having a threaded hole formed therein;

a cover placeable in covering relation over the base and being removably attachable thereto, the base and cover defining an inlet and an outlet therebetween for respectively receiving said electrical wires, the outlet being spaced away from the inlet; and a terminal assembly comprising:

said at least one metallic conductor attached to the at least one mounting block; and adjustably tightenable means for clamping said electrical wires against the metallic conductor, wherein the adjustably tightened clamping means is operatively connected to the housing base.

9. The device of claim 8, wherein said at least one metallic conductor comprises at least two metallic conductors.

10. The device of claim 8, wherein said at least one metallic conductor comprises at least three metallic conductors.

11. The device of claim 8, wherein said at least one mounting block comprises at least two mounting blocks, and wherein said at least one metallic conductor comprises at least two metallic conductors respectively mounted on said at least one mounting blocks.

12. The device of claim 11, wherein the at least one mounting blocks are colored differently from one another.

* * * * *